United States Patent
Lau et al.

(10) Patent No.: US 12,509,395 B2
(45) Date of Patent: Dec. 30, 2025

(54) METHODS AND COMPOSITIONS FOR PRODUCTION OF GREEN MORTAR

(71) Applicant: CITY UNIVERSITY OF HONG KONG, Kowloon (HK)

(72) Inventors: Denvid Lau, Kowloon (HK); Huali Hao, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 989 days.

(21) Appl. No.: 17/355,166

(22) Filed: Jun. 22, 2021

(65) Prior Publication Data

US 2022/0402818 A1    Dec. 22, 2022

(51) Int. Cl.
  *C04B 24/28* (2006.01)
  *C08J 7/12* (2006.01)
  *C04B 24/00* (2006.01)

(52) U.S. Cl.
  CPC ............. *C04B 24/283* (2013.01); *C08J 7/123* (2013.01); *C04B 24/00* (2013.01); *C08J 2367/02* (2013.01)

(58) Field of Classification Search
  CPC ........ C04B 24/00; C04B 24/283; C08J 7/123; C08J 2367/02
  USPC ........................................................ 427/535
  See application file for complete search history.

(56) References Cited

U.S. PATENT DOCUMENTS

| | | | |
|---|---|---|---|
| 6,000,877 A * | 12/1999 | Fishback | C08L 95/00 106/284.01 |
| 10,351,476 B2 * | 7/2019 | Nakayama | C04B 40/02 |
| 10,669,201 B2 * | 6/2020 | Ali | C04B 18/20 |
| 10,704,266 B1 * | 7/2020 | McDonough | B29C 53/04 |
| 11,161,786 B2 * | 11/2021 | Lake | C04B 40/0042 |
| 11,498,870 B2 * | 11/2022 | Barrow | C04B 20/02 |
| 11,932,766 B2 * | 3/2024 | Khatri | C08L 95/00 |
| 2015/0360995 A1 * | 12/2015 | Carlson | C04B 28/04 106/713 |
| 2019/0202100 A1 * | 7/2019 | Thomas | C08J 3/20 |
| 2021/0107833 A1 * | 4/2021 | Lake | C04B 14/22 |
| 2021/0331975 A1 * | 10/2021 | Shukla | C04B 18/08 |
| 2021/0371347 A1 * | 12/2021 | Darling | C04B 40/0608 |
| 2023/0235216 A1 * | 7/2023 | Liu | C09K 8/42 106/655 |
| 2024/0010559 A1 * | 1/2024 | Boulding | C04B 28/02 |
| 2024/0254058 A1 * | 8/2024 | Burgess, III | C04B 14/026 |

* cited by examiner

*Primary Examiner* — Brian K Talbot
(74) *Attorney, Agent, or Firm* — Conley Rose, P.C.; Michael W. Piper; Gayatry Nair

(57) ABSTRACT

A method of pre-treating plastic using plasms is disclosed. The plasma is applied to plastic in an atmosphere such as oxygen that encourages formation of functional groups on an otherwise inert plastic surface. The functional groups such as hydrogen group, carboxyl group, and formyl group are introduced on the surface of the recycled plastics. This allows the use of plastic to replace part of the sand aggregate in mortar, resulting in a more environmentally friendly mortar.

2 Claims, 4 Drawing Sheets

METHODS AND COMPOSITIONS FOR PRODUCTION OF GREEN MORTAR

TECHNICAL FIELD OF THE INVENTION

The present disclosure relates to cement compositions. More particularly, the present disclosure relates to methods for the production of mortar used in structural applications.

BACKGROUND OF THE INVENTION

Traditional mortar consists of a mixture of cementitious materials and aggregates such as sand. The cementitious materials are typically ordinary Portland cement, comprising a mixture of calcium, silica, alumina and iron.

Proposals have been made to enlarge the range of available raw materials useable as aggregates in making mortars. One of these is in utilization of waste plastics. This is an attractive resource as recycling consumable plastic waste is relatively cheap, supply is easily available, and mitigates the scarcity, cost and environmental concerns of landfills.

For example, China patent CN111153656 proposes adding silica gel powder into concrete or mortar. Another China patent CN106927751A proposes adding plastic particles that are modified by mixing with PVC (polyvinylchloride) particles.

However, none of these methods improve the natural lack of affinity between plastic with water and cementitious materials. Instead, these methods rely on chemical additives and enhancers to improve the miscibility of the plastic in a cementitious mixture. These chemicals can adversely affect the nature of the final mortar or the environment in which the mortar is deployed.

Furthermore, merely mixing plastic into mortar mixtures compromises compressive strength and durability of the mortar, and this unfavourably impacts the service life of the mortar.

Accordingly, it is desirable to propose a way of incorporating plastic in mortar as aggregate which does not reduce or compromise the desirable properties of mortar and, possibly, improve the properties.

STATEMENTS OF INVENTION

In a first aspect, the invention proposes a method of preparing plastic for use as aggregate in mortar comprising the steps of: providing plastic particles of a size suitable for use as aggregate in mortar; treating the surface of the plastic particles by plasma to improve miscibility of the plastic particles with cement and water.

On one hand, the treatment by plasma creates functional groups on the surface of the plastic particles, especially if the treatment takes place in the presence of oxygen. On the other hand, the treatment by plasma roughens the surface of the plastic particles. It is possible that treatment in an inert atmosphere, such as one filled with argon, promotes more roughening of the plastic surfaces than provides functional groups on the surfaces.

Accordingly, the method provides the possibility of inducing chemical functional groups on the surface of relatively inert plastics, to modify the surface properties of the plastics. Many functional groups are naturally dipolar. This improves the miscibility of the plastic in a water based earth matrix.

Furthermore, dipolar functional groups are hydrophilic and encourage hydration when mixed into cement. This influences the structure of hydrated products, as well as contributes to interfacial bonding.

Preferably, the plastic particles are treated by plasma in pure oxygen, such that the functional groups are likely to include oxygen containing functional groups such as hydroxyls, carboxyl or formyl groups. Alternatively, the plastic particles are treated by plasma in the presence of air, such that the functional groups formed are likely to include both oxygen and non-oxygen containing functional groups (such as amines).

As the skilled man knows, oxygen in functional groups provides a dipolar nature that provides hydrophilic affinity. The presence of oxygen in the atmosphere encourages the creation of more oxygen-including functional groups.

Plasma treatment roughens the surface of the plastic particles as plasma etches away the surface of the plastic particles in a random matter. An irregular, roughened surface provides more surface area for cooperating with cement, and this leads to further improvement in the bonding strength between the plastic particles and cement.

Preferably, the plastic is recycled from consumer plastic waste. This provides the advantage of reducing plastic waste by giving a new lease of life to consumer waste plastics. However, it is not necessarily that waste plastic is used, as the use of plastic can be due to other reasons. For example, plastic can be the choice material for partial replacement of sand aggregate in order to reduce density of mortar, in which case there is less motivation for the plastic to be recycled plastic.

In a second aspect, the invention proposes a plastic aggregate for a cementitious mixture; wherein the plastic has surface that is treated with plasma. Typically, the plastic is treated by plasma in an oxygen-containing atmosphere or, alternatively, in the presence of pure oxygen. Alternatively, it is also possible to treat the plastic in the presence of other gases, depending on the preferred types of functional groups to be formed on the surface of the plastic.

It has been found that polyethylene terephthalate (PET) treated with plasma for about 20 min at a pressure of around 1,000 mTorr in the presence of oxygen gives promising results.

In a third aspect, the invention proposes an aggregate for cement mixture comprising sand and/or earth based particles; and plasma-treated plastic. The sand aggregate can contain plasma-treated plastic between 0.01 wt. % to 10 wt. % to the whole of the aggregate. Preferably, it appears that the aggregate typically contains plasma-treated plastic at 10 wt. % contributes to the best improved mortar, potentially increasing the lifespan of mortar from 50 years to 70 years. In other words, the typical sand aggregate is replaced by plasma-treated plastic by up to 10 wt. %.

In a fourth aspect, the invention proposes a formulation for producing mortar comprising ratio of hydrated cement:aggregate material:water 1:2.75:0.485, wherein the aggregate material comprises plasma-treated plastic. Typically, but not necessarily, the plastic in the formulation is recycled plastic.

In a fifth aspect, the invention proposes mortar comprising plasma-treated plastic as aggregate.

In a sixth aspect, the invention proposes a method of making mortar comprising the steps of providing a ratio of hydrated cement:aggregate material:water 1:2.75:0.485; the aggregate material comprising 0.01 wt. % to 10 wt. % plasma-treated plastic; casting the mortar; immersing the mortar in water for 24 hours; drying the mortar for 24 hours; and curing the mortar at 20 degrees Celsius for 28 days.

The invention offers several advantages. It has been found that plasma treatment is effective to improve the compressive properties of mortar using recycled PET. Furthermore, besides of the reduction in amount of concrete needed for new construction and the carbon footprint, the invention provides a possibility of partial replacement of aggregates in concrete by waste plastic.

The recycling rate of plastic wastes is expected to be significantly improved as the invention gains widespread use. Potentially, the invention may help to reduce more than thousands tonnes of plastic waste per year and the expected saturation time of landfill can be delayed.

In particular, the invention provides the possibility of modifying the surface of recycled PET. Plasma-treated PET is useable as a portion of the aggregates in novel mortar recipes. The resultant mortar is likely to have improved compressive strength compared with mortar using un-treated PET as aggregate.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

In the present embodiment, small plastic pieces or plastic particles are treated with plasma in the presence of oxygen under specific pressure for a specific period of time to induce or improve hydrophilic properties on the surface of the plastic. The plastic particles are then mixed into standard aggregate (e.g., sand) materials, for use in producing mortar.

Figure 1:
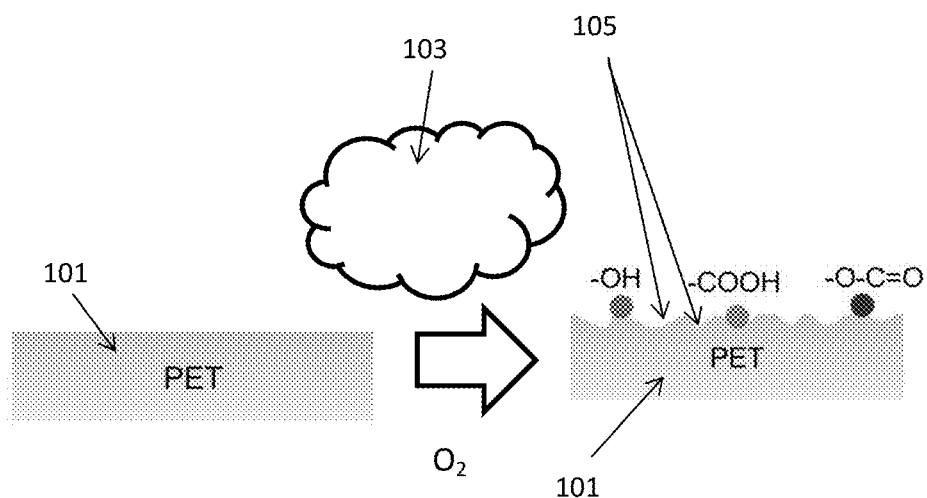
FIG. 1 is a depiction of an embodiment of the invention.

FIG. 1 is a schematic illustration showing plasma treatment of one of such plastic particles 101. The small piece of plastic 101 has a size that is amenable to being mixed into sand. The mixture of sand and plastic particles provides an aggregate mixture that can be further mixed with water and a cementitious material to product mortar that has tightly packed aggregates. The actual size into which the plastic particles should be cut for optimal mixing with sand is purpose-dependent, and this may be determined by the relevant manufacturers in practice and does not need elaboration here.

The plastic particles described herein may be used to make concrete, but they are more particularly suitable for making mortar. As the skilled man knows, concrete is a mixture of water, cement, sand just like mortar. However, concrete also has gravel and other coarse aggregates that make it stronger and more durable. On the other hand, mortar is a more straightforward mixture, being generally just a mixture of water, cement, and sand, and has a higher water-to cement ratio than concrete during mixing.

Typically, plastics used in everyday life tend to be inert chemically. This is because consumer waste plastics would have been used mainly as clothing, packaging or container materials, and such uses would require the plastics to be unreactive. However, this also means that waste consumable plastics tend to be incapable of forming intermolecular attractions with other materials easily, and therefore has inadequate affinity with water and many of the earthy materials used in a cementitious mixture.

In the present embodiment, applying plasma 103 to the surface of plastic allows the plasma 103 to excite atoms into arranging themselves randomly into different types of stable, functional groups on the plastic surface.

As the skilled reader knows, plasma is a state of matter that exists in the form of ions and electrons. Plasma may be described as a gas that's been electrified such that it has become charged with freely moving electrons in both negative and positive states, neutral atoms, atomic ions, electrons, molecular ions, and molecules present in excited and ground states, and carries a substantive amount of internal energy.

Functional groups, particularly those that contain oxygen, tend to be dipolar, which provide hydrophilic attraction that is suitable for being mixed into water based mixture such as a cementitious mixture for making concrete. That is, the functional groups introduced on the surface of the plastic can improve the bonding strength at interfacial transition zone with cementitious materials.

Furthermore, the functional groups can affect the cement hydration which significantly influences the structure of hydrated products, as well as contributes to interfacial bonding.

FIG. 1 also illustrates how, upon treatment with plasma 103, the surface of the plastic piece 101 is also eroded randomly at different parts of the plastic surface and to different extents. This creates microscopic pits and cavities 105 on the surface of the plastic particles 101, giving an irregular, roughened surface profile. Such a roughened surface of the plastic particles 101 improves the interaction between the plastic particles 101 with the surrounding cementitious particles, and brings about an improvement in the bonding strength.

As the skilled man knows, cementitious materials tend to include in different variations calcium, aluminium, silicon, oxygen and/or sulphur, which set and harden by reaction with water. Hydrated cements include but are not limited to pozzolana cements, gypsum cements, calcium aluminate cements, phosphate cements, high alumina content cements, silica cements, high alkalinity cements, shale cements, acid/base cements, magnesia cements, fly ash cement, zeolite cement systems, cement kiln dust cement systems, slag cements, micro-fine cement, metakaolin, and combinations thereof.

Accordingly, introduction of functional groups to the plastic surface overcomes the inert or neutral nature of the plastic, and increases the number and type of interactions that may be formed between the plasma-treated plastic 101 and components of cementitious compositions, in the presence of water, resulting in an improved bonding or adherence.

In the preferred embodiment, the plastic is PET or polyethylene terephthalate. PET is a common thermoplastic polymer which is of the polyester family, and is used often in fibres for clothing. However, different similar plastic may be used in other embodiments.

Figure 2:
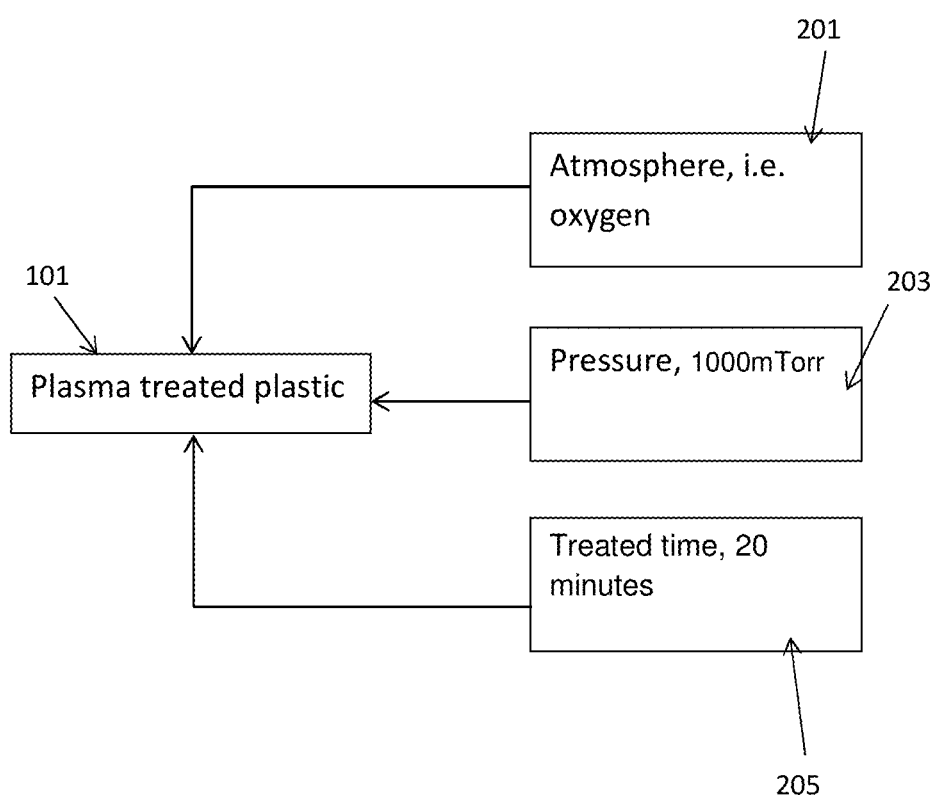
FIG. 2 shows factors for optimizing the properties of the mortar.

The preferred conditions in which PET is treated is illustrated in FIG. 2. The plasma treatment of the PET plastic is carried out in atmosphere of oxygen, shown as 201, or at least an oxidizing atmosphere such as air. This increases the likelihood of creating oxygen-containing functional groups on the plastic surface, such as hydroxyl groups, formyl groups, carboxyl groups on the surface of the plastic is encouraged. Non-oxygen containing groups such as amines may be formed too.

More specifically, plasma treatment of a plastic can introduce functional groups (—COOH, —NH$_2$, —OH, —CHO, epoxy, formyl group, etc.) on the to the plastic material's surface.

Furthermore, the plasma treatment is preferably carried out in 1000 mTorr, at 203, for 20 minutes, at 205. As plasma is a flux of energy that randomly creates and destroys matter, 20 minutes of plasma treatment under these conditions has been found to be the sufficient to reach the optimal or a steady state of creating functional groups on the plastic surface. In practice, the skilled man would understand that any slight variation of the actual conditions that achieve the same surface activation of the plastic by creating functional groups thereon in about 20 minutes is considered equivalent.

The plasma-treated plastic is mixed into the typical aggregate material such as sand, to make up to 10% of the aggregate.

Figure 3:
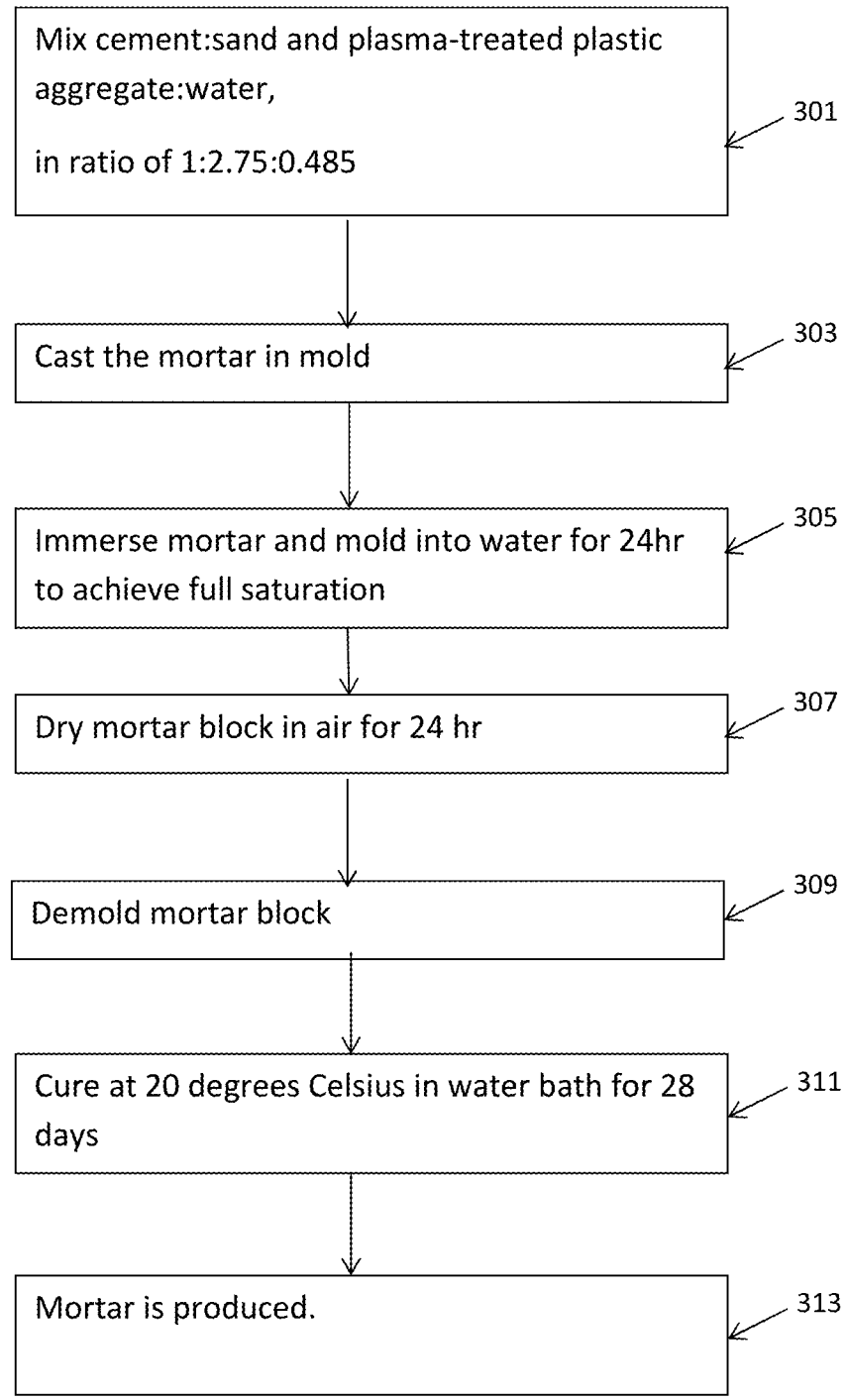
FIG. 3 shows a process of making the mortar.

FIG. 3 shows the process in which sand pre-mixed with plasma-treated plastic is used as part of sand aggregate to make mortar. Firstly, making of mortar comprises the step of mixing cementitious material (e.g., ordinary Portland cement) to the aggregate (e.g., sand and suitably sized plasma-treated plastic) to water with a fixed proportion of 1:2.75:0.485, at step 301. This particular ratio found to be favourable for optimal performance of the resultant mortar.

The fresh mortar is cast into a mould, at step 303. Subsequently, the entire mortar and mould is immersed in water, at step 305, to achieve full saturation of water. Next, the mortar is dried in air for 24 hours, at step 307. Upon completion of the drying cycle, the mortar block is removed from the mould, at step 309. The dried mortar block is wrapped and immersed into a water bath to cure at 20 degrees Celsius for 28 days, at step 311. After the 28 days, the cured mortar block 313 is produced.

Mortar 313 containing plasma-treated plastic is found to have a compressive strength that is increased by about 10% when compared to an otherwise similar mortar that does not contain a plasma-treated plastic. The mortar is also found to have increased durability.

In variations of the embodiment, mortar containing plasma-treated plastics (PTP) is found to have a compressive strength that is increased by about 10% when compared to an otherwise similar mortar that contains non-treated plastic aggregates. For example, a mortar of the type disclosed herein has a compressive strength of from about 16.3 MPa to about 21.1 MPa as determined by different treated time (The treated pressure is 1000 mTorr, the content of PTP is 10 wt. %), alternatively from about 17.8 MPa to about 21.1 MPa as determined by different treated pressure (The treated time is 20 min and the content of PET is 10 wt. %) or alternatively from about 19.3 MPa to about 21.1 MPa as determined by different PTP content (The treated time is 20 min and the treated pressure is 1000 mTorr). Herein compressive strength is defined as the capacity of a material (e.g., green mortar) to withstand axially directed pushing forces. Beyond the limit of the compressive strength, the material becomes irreversibly deformed and no longer provides structural support and/or zonal isolation.

Accordingly, a type of mortar 313 that is potentially environmentally-friendly made from plasma-treated plastic has been described, which can help overcome problems associated the infusion of mortar with non-treated plastic, namely, the problems of reduction in compressive strength and durability. The mortar as described can lead to reduction in carbon footprint, and may significantly reduce the environmental impacts of ordinary mortar. Besides of the reduction in amount of mortar needed for new construction and carbon footprint, the compositions and methods disclosed herein provide a useful approach to process the plastic waste due to the partial replacement of aggregates in mortar by waste plastic. The embodiments potentially could improve recycling rate of plastic wastes significantly. It is envisioned that the described mortar can help reduce more than thousands of tons of plastic waste per year and the expected saturation time of landfill can be delayed.

Without wishing to be limited by theory, the use of plasma-treated plastic 101 may function as a form of interfacial engineering where plasma-treatment of the plastic can overcome the weak interfacial bonding and affect the cement hydration, solving the reduction of compressive strength with the adoption of plastic.

Figure 4:
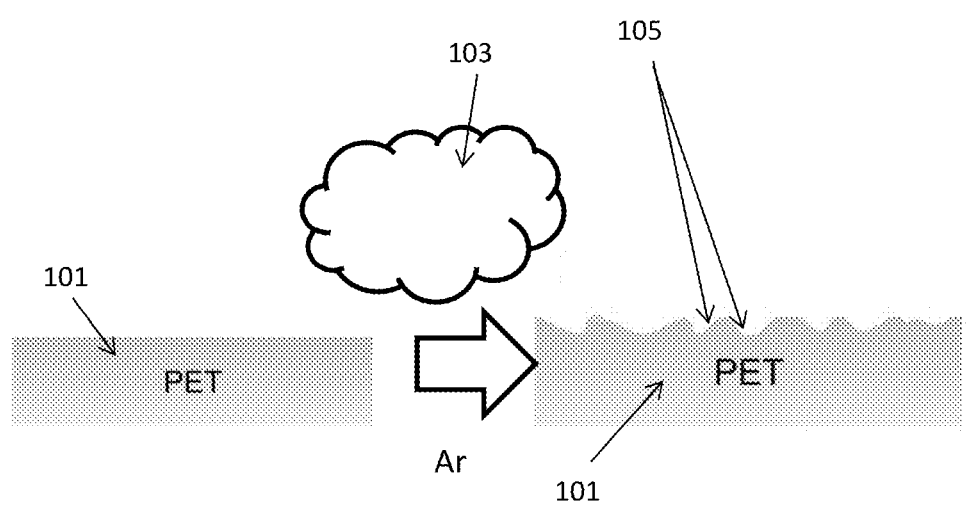
FIG. 4 shows an embodiment alternative to that of FIG. 1.

FIG. 4 shows a further embodiment, in which the plastic is treated with plasma in an inert atmosphere without oxygen, such as an argon atmosphere. In this case, it is likely that less functional groups are formed on the surface of the plastic particles 101, due to lack of oxygen. It is possible that some functional groups are formed nevertheless form rearrangement of atoms that are released from the surface of the plastic particles by the plasma. However, as plasma etches the surface of the plastic piece 101 randomly, multiple microscopic pits and cavities 105 are formed on the surface of the plastic particles 101. The resultant roughened surface of the plastic particles will have improved binding due to the increased in surface area for cooperating with cementitious materials, and also due to increased resistance and friction against being moved or displaced within the cement matrix. Therefore, if for whatever reason it is desired that the plastic particles 101 should have less functional groups on the plastic surface but have improved interaction with cement nevertheless, a highly roughened plastic surface obtained from being treated by plasma in an inert atmosphere may provide such improve interaction with cement to some extent.

In order words, for optimisation and quality control purposes, controlling the amount of oxygen in the atmosphere in which plasma treatment takes places can control so some extent the amount of functional groups versus the degree of roughening of the surface of plastic particles 101.

While there has been described in the foregoing description preferred embodiments of the present invention, it will be understood by those skilled in the technology concerned that many variations or modifications in details of design, construction or operation may be made without departing from the scope of the present invention as claimed.

Non-limiting examples of other plastics include high density polyethylene (HDPE), polyvinyl chloride (PVC), low-density polyethylene (LDPE), polypropylene (PP) and polystyrene (PS).

What is claimed is:

1. A method of preparing a mortar with enhanced compressive strength consisting of
   (a) mixing hydrated cement, an aggregate of sand and plasma-treated polyethylene terephthalate (PET), and water at a ratio of 1:2.75:0.485 to form a first mixture;
   (b) casting the first mixture in a mold to form a mortar;
   (c) immersing the mortar of step (b) in water for 24 hours;
   (d) drying the mortar of step (c) for 24 hours; and
   (e) curing the mortar of step (d) at 20 degrees Celsius for 28 days thereby producing the mortar with enhanced compressive strength, wherein,
   the mortar with enhanced compressive strength has 10 wt. % of the plasma-treated PET, and a compressive strength of about 16.3 MPa to about 21.1 MPa.

2. The method of claim 1, wherein the plasma-treated PET is produced by treating PET with a plasma in an oxygen containing environment for less than 20 min at a pressure of around 1,000 mTorr.

* * * * *